United States Patent [19]

Carr et al.

[11] Patent Number: 4,546,054
[45] Date of Patent: Oct. 8, 1985

[54] SUPPORT ASSEMBLY FOR CELLS OF A SECONDARY BATTERY

[75] Inventors: Dennis D. Carr, Jasper; Riley C. Walton, Joplin, both of Mo.

[73] Assignee: Eagle-Picher Industries, Inc., Cincinnati, Ohio

[21] Appl. No.: 704,182

[22] Filed: Feb. 22, 1985

[51] Int. Cl.$^4$ .............................................. H01M 2/10
[52] U.S. Cl. ..................................... 429/101; 429/186
[58] Field of Search .............................. 429/101, 186

[56] References Cited

U.S. PATENT DOCUMENTS

| | | | |
|---|---|---|---|
| 2,981,779 | 2/1961 | Freund | 136/90 |
| 3,250,645 | 5/1966 | Zahn et al. | 136/14 |
| 4,038,461 | 7/1977 | Warnock | 429/21 |
| 4,115,630 | 9/1978 | Van Ommering et al. | 429/72 |
| 4,250,235 | 2/1981 | DuPont et al. | 429/211 |
| 4,420,545 | 12/1983 | Meyer et al. | 429/101 |
| 4,477,540 | 10/1984 | Miller et al. | 429/27 |

*Primary Examiner*—Donald L. Walton

*Attorney, Agent, or Firm*—Wood, Herron & Evans

[57] ABSTRACT

A secondary battery, such as a nickel-hydrogen (NiH$_2$) cell, has a first and a second cell stack, each cantilevered from opposite sides of a weld ring. The weld ring is located at the approximate center or middle of a pressure vessel composed of two half sections which are welded to opposite sides of the weld ring. The cell stacks are essentially unsupported at their outer ends. Electrical current carriers are received in longitudinal channels formed on opposite sides of an axially located cell stack support member, on which the cell elements are captured. Cantilever mounting of two cell stacks from a central weld ring is found to improve the integrating and durability of the cell. It also increases the eneregy capacity of the battery through the ability to add more cells through the use of axially longer pressure vessels, increasing the capacity of the battery. Location of the weld ring between the pair of cell stacks improves heat transfer between the cells and the pressure vessel during discharge.

11 Claims, 3 Drawing Figures

SUPPORT ASSEMBLY FOR CELLS OF A SECONDARY BATTERY

FIELD OF THE INVENTION

This invention relates generally to metal-gas secondary batteries or cells, such as NiH$_2$ cells, and more particularly relates to an improved support assembly and arrangement of the cell stack.

BACKGROUND OF THE INVENTION

Metal-gas cells or batteries, such as nickel-hydrogen cells, are contained in sealed metal vessels or casings (often referred to as cans) which contain hydrogen gas under high pressure. This gas pressure may, for example, vary between about 0 psi and 1000 psi during each cycle charge-discharge operation. Each such cell has at least one nickel-containing positive electrode which is spaced from a hydrogen-forming negative electrode. A pair of positive and negative electrodes makes up the individual cell, with a plurality of such cells forming the battery. A plurality of such electrode pairs are generally organized in the form of plates which are stacked to form a plate stack. The stack also includes gas diffusion plate separators which prevent short circuiting contact between the positive and negative electrodes, and which also hold a sufficient quantity of electrolyte for cell operation.

The electrolyte is typically an alkaline medium such as an aqueous solution of alkali metal hydroxide, generally approximately a 30% potassium hydroxide solution. The negative (hydrogen-forming) electrode or anode is typically a plastic bonded, metal powder plate. The metal powder is usually platinum or palladium which will catalyze a hydrogen dissociation reaction in the aqueous electrolyte. The plastic bonding material can be a tetrafluoroethylene, for example. The active material of the positive plate or cathode is generally nickeloxyhydroxide.

Hydrogen in the vessel diffuses through a diffusion mesh of tetrafluoroethylene or the like to reach the catalytic anode. The anode causes molecular H$_2$ to dissociate into atomic hydrogen, which in turn reacts with free hydroxyl groups to form water plus free electrons. The water and the free electrons react with the nickeloxyhydroxide cathode to form nickel hydroxide plus free hydroxyl groups. Reverse reactions occur during charging.

The components of the cell stack (i.e., anodes, cathodes, separators) are conventionally made in a disc-shape and are arranged along a common axis. A single plate stack has been used, which is mounted in a cylindrical shaped pressure vessel having hemispherical ends. The pressure vessel is ordinarily formed from two casing portions joined at an equatorial weld ring.

Nickel-hydrogen cells are relatively long lived, have a wide operating temperature range and a high energy density. They have been widely adopted as a preferred electrical storage system for earth-orbiting satellites.

Due to the great expense of these satellites, the chance of cell failure must be absolutely minimized. The cells must as well be designed to endure the forces encountered when the satellite is launched, for example. It is also most critical that the mass and volume of these cells be as low as possible, while their energy storage and generation capabilities are maximized. For these reasons, considerable attention has been directed to the structure which supports the cell stack in the pressure vessel.

One known way to support the plate stack is by mounting it on a retaining rod which extends axially through a central aperture formed in the components of the stack. The retaining rod is supported at its ends by terminals which extend axially outwardly from the centers of the domed ends of the pressure vessel. The plate stack is fixed and may be compressed on the rod by stops or retaining elements.

Mounting the plate stack on a central rod in this manner leads to a relatively large mass and volume for the nickel-hydrogen cell, and further places an undesirable stress on the terminals themselves. This makes the cell more prone to failure. It also makes the cell relatively long due to the axially extending terminals.

One previously known alternative to mounting the plate stack on a central rod is to mount or support the stack in a cantilever fashion from a support surface formed inside the pressure vessel, such as from one side of the weld ring used in interconnecting the two domed casing portions. In this arrangement, the weld ring has been located considerably to one axial side of the center or middle of the pressure vessel. The plate stack is cantilevered (as viewed horizontally) from one side of the weld ring, as on an elongated support rod fixed to the weld ring, and extends through much of the remaining volume of the pressure vessel.

One difficulty with this type of mount for the plate stack is the relatively long lever arm represented by the plate stack on the support rod. Jolting of the cell from acceleration and deceleration or other movements causes the relatively heavy plate stack to vibrate off-axis, particularly at its free end, imposing a torque on the weld ring. Such movements can also cause the stack to bang against the inside of the pressure vessel. Failure of the cell can result, such as from damage to the components of the cell stack from banging into the pressure vessel walls, shorting of the electrodes through contact with the metal pressure vessel, or rupture of the weld ring seal from fatigue.

One possible solution to this problem is to reduce the number of individual cells making up the cell stack, to thereby shorten the lever arm. This reduces the capacity of the battery, however.

Another drawback to cantilever mounting of the cell stack in this fashion is inherent in the fabrication of the pressure vessel itself. The draw process which is typically used for making the pressure vessel limits the maximum size of a can portion to approximately 5-7" in axial length for a 3½" diameter cell. (A 3½" diameter cell is at present standard in the industry for satellite applications.) A pressure vessel is ordinarily constructed with one can portion of about this maximum axial length and within which substantially all of the cell stack is received, and a shorter can portion (or cap) completing the vessel. The maximum length of the plate stack is thus limited by the maximum length of the larger can portion. This construction further reduces the volume available for mounting the plate stack within the pressure vessel, again limiting the capacity of the cell.

Another problem with mounting the plate stack from one side of a weld ring in the foregoing fashion is that heat transfer between the plate stack and the pressure vessel is not efficient. The point of highest heat generation (i.e., during discharge) in a plate stack is at the longitudinal center of the stack. In the cantilever arrangement described above, the center of the stack is considerably offset from the weld ring which transfers heat to the pressure vessel for dissipation.

Also, the larger can portion containing the plate stack has a tendency to balloon or bulge somewhat from the internal pressure, particularly if this larger portion is made to maximum length. This causes undesirable flexing of the pressure vessel during internal pressure changes associated with cyclic charge-discharge operation. It also increases the gap between the plate stack and the pressure vessel wall within which the plate stack can vibrate or shift, again causing greater torque on the weld ring.

SUMMARY OF THE INVENTION

The shortcomings of the prior art have been overcome by the present invention, wherein two cell stack assemblies are cantilevered from opposite sides of a central weld ring. The weld ring is located at the approximate center or middle of a pressure vessel having two half sections. Each half section of the pressure vessel is fixed to a respective side of the weld ring. The two cell stack assemblies are preferably of about equal size and weight and are therefore substantially balanced on the weld ring. This also locates the center of gravity approximately in the middle of the battery.

The single cell stack of the prior art has effectively been split into two halves in this invention, with one half mounted on each of the two sides of the central weld ring. The lever arm presented by each of the two cell stacks is thus effectively one-half of that presented by the prior art single stack structure of the same size (i.e., component weight). The torques imposed on the weld ring by the two cell stacks also tend to offset each other. The integrity and durability of the cell is thus greatly improved.

The capacity of the battery can thereby be considerably increased, since the size of the two cell stacks can each be increased, although this does result in an increase in their respective lever arms. Larger cell stacks can still be provided with an acceptable increase in the length of each lever arm.

This increase in cell capacity goes hand in hand with the feasibility of now increasing the length of the pressure vessel in its axial dimension. This advantage is gained from locating the weld ring in the center or middle of the pressure vessel. That is, two pressure vessel halves can now be drawn to the maximum length possible in the drawing process. This is to be compared with the "one long and one short" pressure vessel portions used in the prior art. It is estimated that use of the longer cans can increase the capacity of a nickel-hydrogen battery from a typical 70 to 90 ampH to 140 to 180 ampH.

Location of the weld ring in the center of the pressure vessel also places it nearer the area of maximum heat generation in the plate stacks, at least for a pair of plate stacks having the same component volume as the prior art single stack. A shorter heat transfer path from the source of heat generation in the stacks to the weld ring and then to the pressure vessel is thereby provided. This improves the life and operation of the battery. Location of the weld ring in the longitudinal center of the can also reduces the "ballooning" effect previously noted. This is because two pressure vessel halves can now be used which are each shorter in length than the one long pressure vessel portion previously used (in combination with a shorter vessel end portion). The shorter length pressure vessel halves are less subject to ballooning.

A preferred embodiment of the invention uses a sectional core piece assembly on which the cell stacks are oppositely mounted. The core piece assembly is comprised of a back-to-back pair of one piece molded polysulfone core halves having a generally planar disc shaped base portion, and a stack support member extending generally perpendicularly (axially) from the base portions. The two core pieces are mounted in back to back relationship on either side of a weld ring/core piece mount and are fixed together and to the weld ring/core piece mount.

A pair of parallel internal channels are formed in each of the perpendicular stack support members. These channels provide routing channels for electrical leads, and give a sturdy I-beam type construction to the core assembly. The cell stacks are mounted on the stack support members of respective core pieces, and are held in place by a polysulfone end cap secured at the free end of the stack support member.

The sectional core piece assembly further provides ease in assembly of the cell. It also facilitates "sizing" the core assembly to fit particular configurations, as by simple substitution of a core piece having a larger support member to support a larger stack for a higher capacity configuration.

The weld ring/core piece support particularly adapted for this invention has a scalloped internal ring design which provides great rigidity for the core piece attachment points, yet restricts heat diffusion to the cell stacks during the weld closure operation. Heat transfer from the cell stacks to the pressure vessel is not substantially affected, however.

The features and advantages of the present invention will be more readily understood upon consideration of the following detailed description of the invention taken in conjunction with the accompanying drawings, in which:

BRIEF DESCRIPTION OF THE DRAWINGS

FIG. 1A is an enlarged detail of the indicated area of FIG. 1; and

DETAILED DESCRIPTION OF THE INVENTION

The specific embodiment of the invention hereinafter described is related to nickel-hydrogen cell technology. It should be recognized that the invention is not so limited to nickel-hydrogen cell technology, however, and those skilled in the art of designing electrochemical energy storage cells can readily adapt the principles of this invention to other high pressure cell designs.

Figure 1:
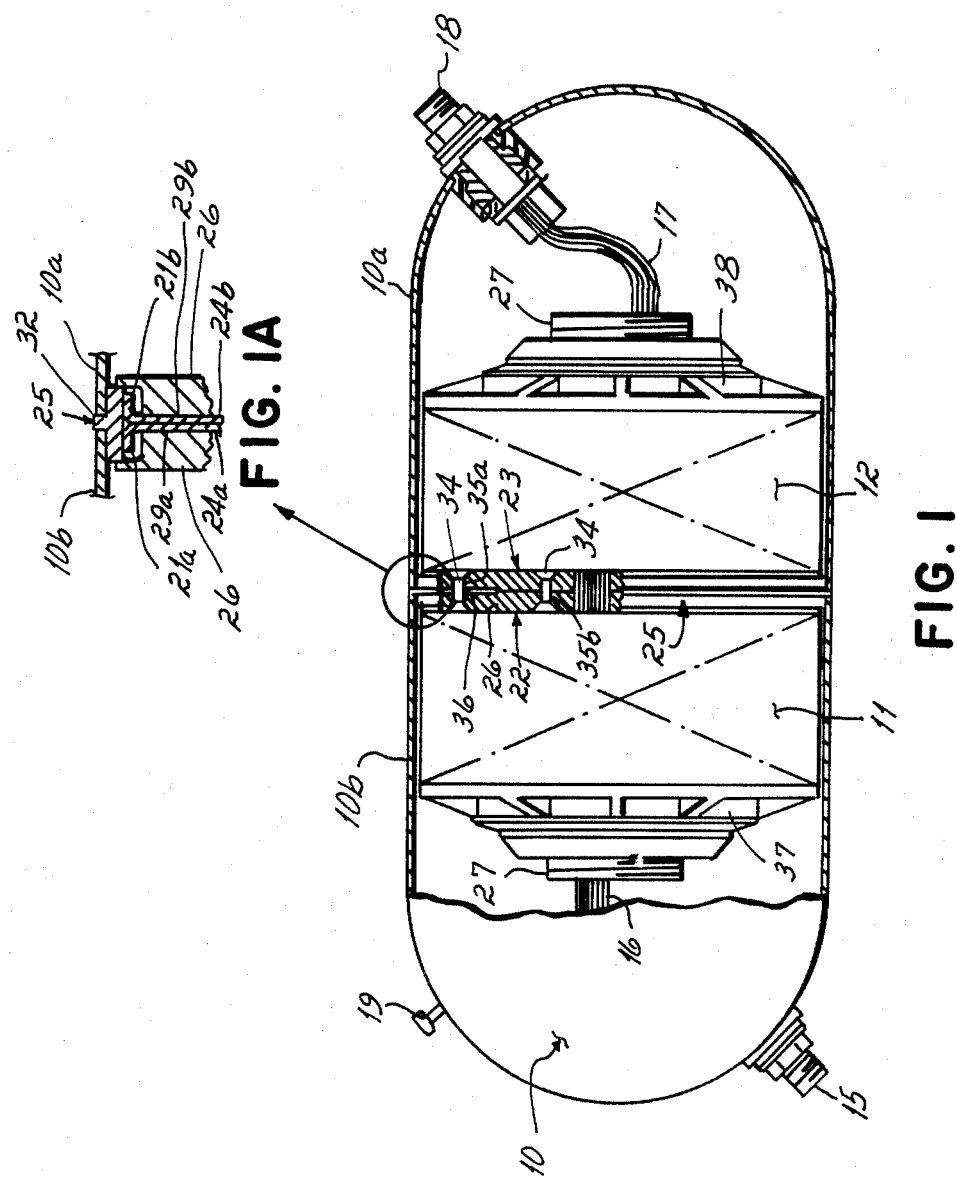
FIG. 1 is a side elevation, partly broken away to show an axial section, of a battery incorporating the features of this invention.

With reference to FIG. 1, a nickel-hydrogen cell is illustrated having a casing or pressure vessel 10 (often referred to as the can) and a pair of axially aligned cell stacks 11 and 12. The can 10 is cylindrical with hemispherical ends, and is formed from two halves 10a10b. As previously noted, these halves or portions of the can 10 are typically fabricated by a drawing process which is limited as to maximum draw length, at least in so far as these cans are adapted for satellite applications. For instance, the maximum length for a draw portion of a can having a radial diameter of $3\frac{1}{2}''$ (which is a standard diameter for satellite applications) is about 5 to 7" in axial length. It may be noted that while the diameter of the can may be limited for use in satellites, the axial length of the can is not as restricted.

Each of the cell stacks 11, 12 is comprised of a stack of essentially disc-shaped components arranged along a common axis. These components ordinarily include a plurality of anodes which are connected electrically to an off-axis negative terminal 15 through leads or connectors 16, and a plurality of cathodes connected electrically by leads or connectors 17 to a positive terminal 18. Separators, gas screens, and the like, of conventional function are disposed between the anodes and the cathodes. Each of the cell stacks is partly saturated with an aqueous solution of potassium-hydroxide electrolyte, and the pressure vessel is filled with hydrogen gas, as through a fill tube 19, to a pressure which may be about 20–30 atmospheres. It will be noted that none of the details concerning the function of the components of the cell stack assemblies forms any part of this invention, and the technology for constructing the same is well known in the art. Reference can be made to U.S. Pat. No. 4,115,630, for example, for the particular arrangement and components of such a metal oxide-hydrogen cell.

It may be noted that the two cell stacks assemblies 11, 12 may advantageously be connected either in series or in parallel, as desired.

Figure 2:
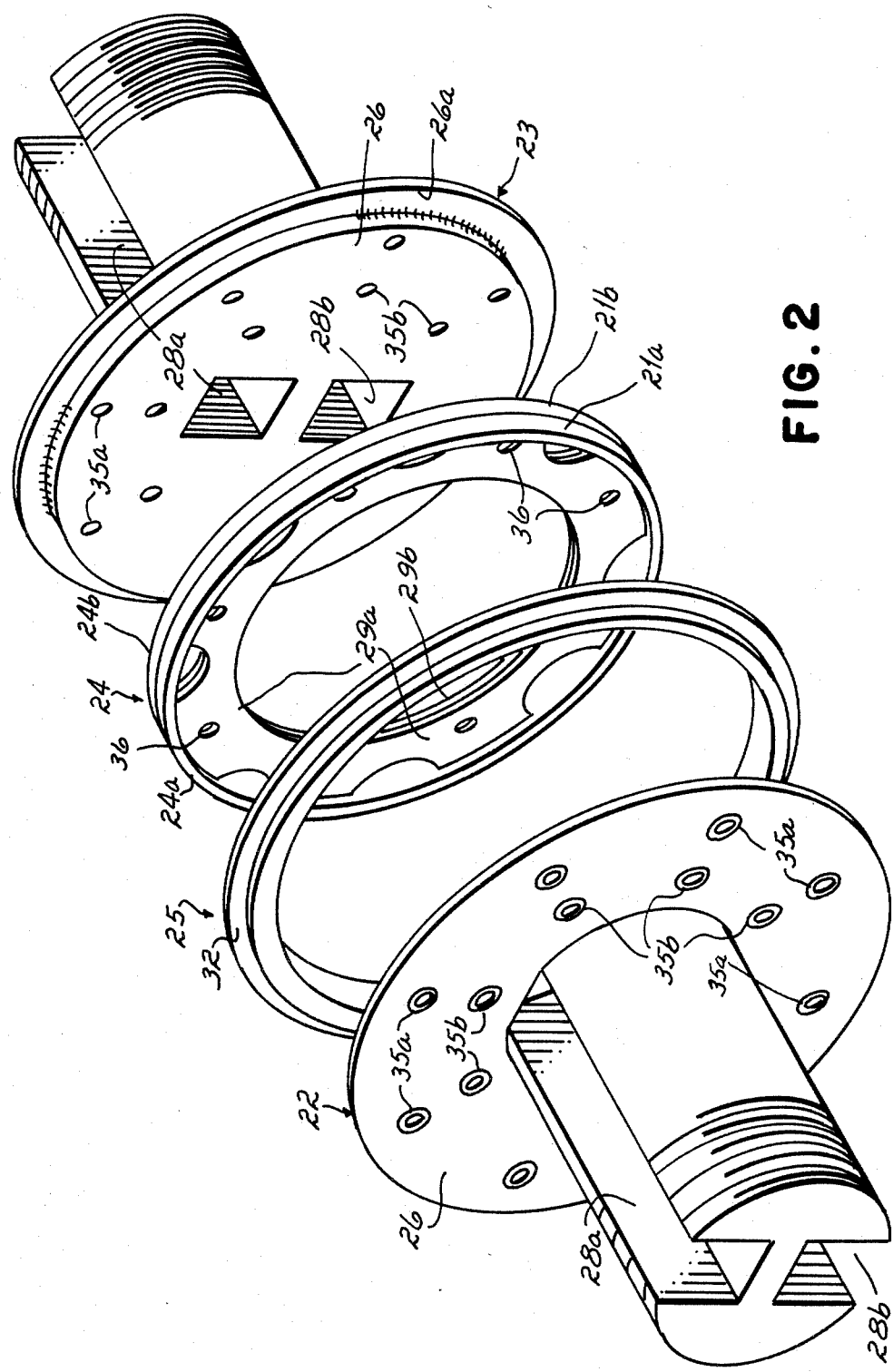
FIG. 2 is an exploded perspective view of a preferred embodiment of the weld ring and core assembly upon which the cell stack assemblies are supported.

With particular reference to FIG. 2, a sectional core assembly is provided upon which the cell stacks 11, 12 are mounted. More specifically, this core assembly comprises a pair of similar but oppositely oriented core pieces 22, 23 upon which the cell stacks 11, 12 are respectively supported, and a central core piece mount 24. The core piece mount 24 is fixed within a weld ring 25, but alternatively can be formed integrally with the weld ring 25.

The two core pieces 22, 23 are made of a non-conducting material such as polysulfone, which is resistant to the high alkaline environment within the cell. Each core piece 22, 23 has a circular base 26 having a shoulder 26a formed on the face which is toward the weld ring. A cylindrical stack support portion 27 is axially centered on the outboard side of the base 26 and extends generally perpendicularly or axially therefrom. A pair of channels 28a, 28b are formed along diametrically opposite sides of each support 27 and extend along the entire length of the support and through base 26. Channels 28a, 28b define an I-beam configuration for supports 27, 27. The electrical connectors 16, 17 to the respective anodes and cathodes are received in the channels 28a, 28b. Each of the core pieces 22, 23 is desirably molded as a single unit.

The two core pieces 22, 23 are secured to opposite sides of the core piece mount 24. Core piece mount 24 is made of Inconel and is stamped or otherwise fabricated from two portions 24a, 24b which are arranged in back to back fashion and spot welded together. Each of the core piece mount portions 24a, 24b have an outwardly turned edge or rim 21a, 21b and an open, sprocket-shaped planar portion 29a, 29b, respectively (see FIG. 1A). An open center is defined in the core piece mount 24, and spaced scallops are formed between the planar portions and the rims, thus defining a sprocket-shape (see FIG. 2).

The core piece mount 24 is fixed within weld ring 25 as by spot welding. Weld ring 25 has a bead 32 formed around its outside perimeter. As particularly shown in FIG. 1A, the edges of the respective can halves 10a, 10b fit against the lateral side edges of the bead 32 and are fixed to the weld ring 25 as by tungsten inert gas or e-beam welding. The can 10 is thereby sealed. It will be noted that the scalloped configuration of the core piece mount 24 advantageously minimizes heat transfer to the components of the stack assemblies 11, 12 during the weld closure operation.

The core pieces 22, 23 are assembled to the combined core piece mount/weld ring 24, 25 assembly by non-electrically conductive rivets 34 (FIG. 1) which extend through holes 35a provided in the bases 26 of the core pieces, and holes 36 provided in the core piece mount 24. In assembly, the core pieces 22, 23 are arranged with their respective channels 28a, 28b aligned with each other, with each of the core pieces then riveted to a respective side of the core piece mount 24. The core pieces 22, 23 are also directly attached to each other through rivets passing through holes 35b provided in their respective bases.

The stack assemblies 11, 12 are received on respective support members 27, and held under compression thereon by polysulfone end caps 37, 38, respectively. These end caps 37, 38 are threaded onto the free ends of the support members 27 of the core pieces 22, 23. The entire core piece mount/weld ring assembly with the cell stacks 11, 12 thereon is then fixed in the can 10 by assembly of the can halves 10a, 10b to the weld ring 25 in the manner previously described.

It will be noted that the cell stack assemblies 11, 12 are slightly spaced away from the interior can wall to prevent electrical contact between the electrodes and the wall and to enable hydrogen gas to permeate the spaces within the cell stack assemblies. The sides of the polysulfone end caps 37, 38 also do not contact the interior can wall. The two cell stack assemblies are thus mounted in a cantilever fashion on either side of the core piece mount/weld ring assembly. The electrical connectors or leads 16, 17 provide essentially no support for the cell stacks, and in fact each lead 16, 17 has a strain relief loop formed therein.

This design for a nickel-hydrogen cell provides for the components of the cell stack assemblies, and the end plates, to be held firmly in position and adjacent to each other, while still providing the necessary insulation between the electrodes of the plate stack assemblies and the pressure vessel walls. The sectional core design promotes ready assembly of the cell, and also permits desirable sizing options for cell design variations. That is, various size core pieces 22, 23 with longer or shorter support members 27 can be assembled and used as desired.

The use of two cell stack assemblies supported in a cantilever fashion on opposite sides of the core piece mount/weld ring greatly reduces the length of the lever arm represented by each separate stack assembly on a support member 27, as compared to the use of a single stack of the same weight and capacity supported by an equivalent single support member. Problems associated with the cell stack assemblies wiggling on the support members from vibration or shock to the cell is thus substantially reduced, improving the overall integrity and durability of the cell.

This design further permits an increase in the energy capacity of the cell, since each of the cell stack assemblies 11, 12 can be increased in terms of the number of individual cells contained therein. This, of course, also increases the lever arm represented by the support member 27 used to support each of the individual stack assemblies, but it is very conceivable that a significant gain in capacity achieved would offset any potential loss of integrity in certain applications.

In conjunction with the ability to increase the size of the cell stack assemblies, the axial length of the can 10 can be increased to the limits of the ability to draw each of the can halves 10a, 10b. A much longer can can thus be fabricated using existing technology than could be used before with the single stack, end supported arrangement. That is, two maximum length can halves can now be joined together, compared to the one short and one long can portions used in the past. The larger cell stack assemblies can therefore be used through this increase in available can volume.

An improvement in heat transfer from within the cell stacks is also achieved by locating the weld ring between the two cell stack assemblies. That is, given two cell stack assemblies 11, 12 which together are the equivalent of a single cell stack assembly of the prior art, location of the weld ring between the two cell stack assemblies places the weld ring much closer to the center of each of the cell stack assemblies, which is the point of highest heat generation. The path of heat transfer is thus significantly reduced, improving the efficiency and longevity of the cell.

Thus, while the invention has been described in connection with a certain presently preferred embodiment, those skilled in the art will recognize modifications of structure, arrangement, portions, elements, materials and components which can be used in the practice of the invention without departing from the principles of this invention.

What is claimed is:

1. A battery comprising:
   a pressure vessel having two half sections,
   a weld ring having two opposite sides, said half sections being fixed to respective sides of said weld ring,
   first and second cell stacks, each stack including anodes, cathodes, separators and electrolyte,
   means for conducting current from said cell stacks to do work, and
   means for mounting said first cell stack to one side of said weld ring within one half section and said second cell stack to the other side of said weld ring in the other half section.

2. The battery of claim 1 wherein said means for mounting said cell stacks includes a stack support member extending generally perpendicularly from each side of said weld ring, said first and second cell stacks being mounted on said stack support member on opposite sides of said weld ring.

3. The battery of claim 1 wherein said means for mounting said cell stacks comprises a pair of core pieces, each core piece having an end plate and a cantilever portion extending generally perpendicularly from one side of said end plate, and a core piece support formed on said weld ring, at least one of said core piece end plates being fixed to said core piece support, and the other of said core piece end plates being fixed to at least one of said core piece support and said other core piece end plate.

4. The battery of claim 2 wherein said two half sections are substantially identical in size, said weld ring thereby being located at the longitudinal mid-point of said pressure vessel.

5. The battery of claim 4 wherein the weight distribution of said cell stacks is substantially equal on both sides of said weld ring.

6. The battery of claim 1 wherein said means for mounting said cell stacks comprises a pair of core pieces, each core piece having an end plate, a stack support member extending generally perpendicularly from said end plate and having a free end, a core piece support formed on said weld ring, and an end cap received on said free end of said support member,
   said anodes, cathodes and separators of said cell stacks each having an opening defined therein such that said support member is inserted through said openings with said anodes, cathodes and separators captured on said support member by a respective end cap,
   at least one of said core piece end plates being fixed to said core piece support, and the other of said core piece end plates being fixed to at least one of said core piece support and the other core piece end plate.

7. A secondary battery comprising:
   a pressure vessel casing having two half sections, each half section having a cylindrical portion and an integral domed end portion,
   a weld ring having two sides, said half sections being fixed to opposite sides of said weld ring,
   first and second cell stacks, each stack including a plurality of anodes, cathodes, separators and electrolyte,
   a pair of electrical terminals,
   electrical connectors connecting said cell stacks to said terminals, and
   means for mounting said first cell stack on one side of said weld ring and said second cell stack on the other side of said weld ring, said weld ring providing the sole support for said mounting means.

8. The battery of claim 7 wherein said mounting means provides the sole support for said cell stacks.

9. An improved electrochemical cell structure comprising:
   a pressure vessel casing having two likesized half sections, each half section having a domed end and an open end defined by a circumferential edge,
   a weld ring to which each of said half section open ends is fixed, said weld ring having two sides, a half section being fixed to a respective side along said circumferential edge,
   a pair of cell stack assemblies including a plurality of anodes, cathodes, separators and electrolytes, and
   means for mounting one cell stack to one side of said weld ring, and the other cell stack to the other side of said weld ring.

10. The improved cell structure of claim 9 wherein said means for mounting said cell stacks comprises a pair of core pieces, each core piece having an end plate and a cantilever stack support member extending generally perpendicular from one side of said end plate, and a core piece support formed on said weld ring, at least one of said core piece end plates being fixed to said core piece support, and the other of said core piece end plates being fixed to at least one of said core piece support and said other core piece end plate.

11. The improved cell structure of claim 10 wherein each said core piece has a pair of parallel channels formed therein which extend through said stack support member and said end plate, said channels also extending generally parallel to a longitudinal axis of said stack support member, and further including a pair of end caps, each end cap received on a respective stack support member in threaded engagement therewith.

* * * * *